US011847118B1

(12) United States Patent
Leeka et al.

(10) Patent No.: US 11,847,118 B1
(45) Date of Patent: Dec. 19, 2023

(54) QUERY SET OPTIMIZATION IN A DATA ANALYTICS PIPELINE

(71) Applicant: Microsoft Technology Licensing, LLC, Redmond, WA (US)

(72) Inventors: Jyoti Leeka, Sunnyvale, CA (US); Sunny Gakhar, Seattle, WA (US); Hiren S. Patel, Bothell, WA (US); Marc Todd Friedman, Seattle, WA (US); Brandon Haynes, Seattle, WA (US); Shi Qiao, Redmond, WA (US); Alekh Jindal, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/808,216

(22) Filed: Jun. 22, 2022

(51) Int. Cl.
*G06F 16/00* (2019.01)
*G06F 16/2453* (2019.01)
*G06F 16/27* (2019.01)
*G06F 16/2458* (2019.01)

(52) U.S. Cl.
CPC .... *G06F 16/24542* (2019.01); *G06F 16/2471* (2019.01); *G06F 16/278* (2019.01)

(58) Field of Classification Search
CPC .......... G06F 16/24542; G06F 16/2471; G06F 16/278
See application file for complete search history.

(56) References Cited

U.S. PATENT DOCUMENTS

| 2006/0218123 | A1* | 9/2006 | Chowdhuri | ....... G06F 16/24532 |
| 2008/0281786 | A1* | 11/2008 | Duffy | .................... G06F 16/284 |
| 2013/0138626 | A1* | 5/2013 | Delafranier | ....... G06F 16/90324 707/713 |
| 2017/0199875 | A1* | 7/2017 | Nevrekar | ............. G06F 16/9032 |
| 2021/0049141 | A1* | 2/2021 | Bauer | ................. G06F 16/2453 |
| 2023/0048391 | A1* | 2/2023 | Jeong | ................ G06F 16/24542 |

OTHER PUBLICATIONS

"A framework for real-life data science", Retrieved From: https://web.archive.org/web/20220529161030/https://metaflow.org/, May 29, 2022, 3 Pages.
"Apache Airflow", Retrieved From: https://web.archive.org/web/20220529232021/https://airflow.apache.org/, May 29, 2022, 4 Pages.
"AWS Data Pipeline", Retrieved From: https://web.archive.org/web/20220518162304/https://aws.amazon.com/datapipeline/, May 18, 2022, 5 Pages.

(Continued)

*Primary Examiner* — Diedra McQuitery
(74) *Attorney, Agent, or Firm* — ARENTFOX SCHIFF LLP

(57) ABSTRACT

In a set of data analytics queries, at least a one of the queries comprising more than one operator, and each query being at least one of i) a producer of data for an other query in the set, and ii) a consumer of data from an other query in the set. In such examples, one or more computing devices identify each producer/consumer relationship between the queries. The one or more computing devices identify one or more optimizations among the queries based on the identified relationships. The one or more computing devices then apply at least one identified optimization to at least one of the queries.

20 Claims, 8 Drawing Sheets

(56) References Cited

OTHER PUBLICATIONS

"Google Dataflow", Retrieved From: https://web.archive.org/web/20220514034545/https://cloud.google.com/dataflow/, May 14, 2022, 16 Pages.

"The data orchestration platform built for productivity", Retrieved From: https://web.archive.org/web/20220516083344/https://dagster.io/, May 16, 2022, 8 Pages.

Agrawal, et al., "Automatic physical design tuning: workload as a sequence", In Proceedings of ACM SIGMOD international conference on Management of data, Jun. 27, 2006, pp. 683-694.

Aguilar-Saborit, et al., "POLARIS: The Distributed SQL Engine in Azure Synapse", In Proceedings of the VLDB Endowment, vol. 13, Issue 12, Jul. 31, 2020, pp. 3204-3216.

Chaudhuri, et al., "AutoAdmin "what-if" index analysis utility", In Proceedings of the ACM SIGMOD international conference on Management of data, Jun. 1, 1998, pp. 367-378.

Chung, et al., "Unearthing Inter-Job Dependencies for Better Cluster Scheduling", In Proceedings of 14th USENIX Symposium on Operating Systems Design and Implementation, Nov. 4, 2020, pp. 1205-1223.

Dageville Benoit, "Snowflake Data Cloud", Retrieved From: https://www.cidrdb.org/cidr2021/keynotespeakers.html, Jan. 11, 2021, 3 Pages.

Dalvi, et al., "Pipelining in multi-query optimization", In Journal of Computer and System Sciences, vol. 66, Issue 4, Jun. 2003, pp. 728-762.

Fjällström, Per-Olof, "Algorithms for graph partitioning: A survey", In Publication of Linköping University Electronic Press, vol. 3, Sep. 1998, 37 Pages.

Jindal, et al., "Peregrine: Workload Optimization for Cloud Query Engines", In Proceedings of the ACM Symposium on Cloud Computing, Nov. 20, 2019, pp. 416-427.

Jindal, et al., "Production Experiences from Computation Reuse at Microsoft", In Proceedings of the 24th International Conference on Extending Database Technology, Mar. 23, 2021, pp. 623-634.

Nick, "Microsoft uses real time telemetry 'Asimov' to build, test and update Windows 9", Retrieved From: https://mywindowshub.com/microsoft-uses-real-time-telemetry-asimov-build-test-update-windows-9/, Sep. 29, 2014, 2 Pages.

Power, et al., "The Cosmos Big Data Platform at Microsoft: Over a Decade of Progress and a Decade to Look Forward", In Proceedings of the VLDB Endowment, vol. 14, Issue 12, Jul. 1, 2021, pp. 3148-3161.

Roy, et al., "Efficient and extensible algorithms for multi query optimization", In Proceedings of the ACM SIGMOD international conference on Management of data, May 15, 2000, pp. 249-260.

Wang, et al., "Multi-query optimization in mapReduce framework", In Proceedings of the VLDB Endowment, vol. 7, Issue 3, Nov. 2013, pp. 145-156.

Xin, et al., "Production machine learning pipelines: Empirical analysis and optimization opportunities", In Proceedings of the 2021 International Conference on Management of Data, Jun. 20, 2021, pp. 2639-2652.

Zhu, et al., "Phoebe: A Learning-based Checkpoint Optimizer", In Proceedings of the VLDB Endowment, vol. 14, Issue 11, Jul. 1, 2021, pp. 2505-2518.

Chung, et al., "Peering through the Dark: An Owl's View of Inter-job Dependencies and Jobs' Impact in Shared Clusters", In Proceedings of the International Conference on Management of Data, Jun. 30, 2019, pp. 1889-1892.

"International Search Report and Written Opinion Issued in PCT Application No. PCT/US23/022794", dated Sep. 14, 2023, 12 Pages.

\* cited by examiner

QUERY SET OPTIMIZATION IN A DATA ANALYTICS PIPELINE

FIELD OF THE TECHNOLOGY

The technology disclosed herein relates to computerized data processing. Specific examples related to improving the performance of data analytics pipelines by optimizing sets of related queries.

BACKGROUND

Modern data analytics is often expressed as data pipelines, where multiple queries are interconnected by their outputs and inputs to execute critical business functions. A wide range of tools have emerged in recent years to create and manage these data pipelines, including Airflow, Dagster, Azure Data Factory (ADF), AWS Data Pipeline, and Google Dataflow. These tools help users identify data pipelines and run them reliably in the cloud. Given how interconnected workloads have become, it is important to holistically optimize their performance and costs.

Cloud providers run complex analytics pipelines comprising hundreds of thousands of jobs processing petabytes of data daily. The majority of these workloads are made up of interdependent recurring queries that form a data pipeline. FIG. 1 illustrates one such production data pipeline 100 consisting of thousands of queries from the Asimov production cluster, built on top of a database management system (DBMS). Such pipelines analyze telemetry from millions of devices to derive business intelligence. Organizing analytics queries as pipelines helps track the status of devices, test new features, investigate bugs, and push out patches and new functionality swiftly. In the figure, a node corresponds to a recurring query (i.e., the same query executed over periodically updated data) and an edge to a data dependency between two queries. One analysis found that 73% queries produce data files (referred to as streams in the DBMS) that are consumed by one or more consumer queries, and 78% queries consume one or more streams produced by producer jobs.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

In examples of the technology disclosed herein, methods, devices, and computer-readable media for query set optimization. Such examples find use in a set of data analytics queries, at least a one of the queries comprising more than one operator, and each query being at least one of i) a producer of data for an other query in the set, and ii) a consumer of data from an other query in the set. In such examples, one or more computing devices identify ach producer/consumer relationship between the queries. The one or more computing devices identify one or more optimizations among the queries based on the identified relationships. The one or more computing devices then apply at least one identified optimization to at least one of the queries.

In some examples, identifying each producer/consumer relationship includes identifying each producer/consumer relationship as an edge between nodes representing the related queries in a graph. In such examples, the one or more computing devices display a visualization of the graph.

In some examples, identifying one or more optimizations among the queries based on the identified relationships comprises: identifying at least one of: a change in physical design of at least one producer/consumer pair of the set; a change in column projection of at least one query of the set; a split of at least one query of the set into two or more queries; a merger of at least two queries of the set into a merged query; and a reordering of at least two queries of the set. In some such examples, identifying one or more optimizations among the queries based on the identified relationships includes identifying an operation as common across a plurality of consumers of a particular producer that can be moved to the particular producer; and a change in physical design includes moving the identified operation to the particular producer. In some such examples, identifying one or more optimizations among the queries based on the identified relationships includes identifying portions of an output of a given producer as not consumed by any consumer of the producer; and a change in column projection includes deleting the identified portions from the output of the given producer. In some such examples, identifying one or more optimizations among the queries based on the identified relationships includes identifying a merger of at least two queries of the set based on graph partitioning minimizing a number of edges between groups of queries.

In some examples, applying at least one identified optimization to at least one of the queries includes: presenting identified optimizations as annotations to the corresponding queries; receiving selection enabling one or more presented optimizations; and implementing the selected optimizations.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
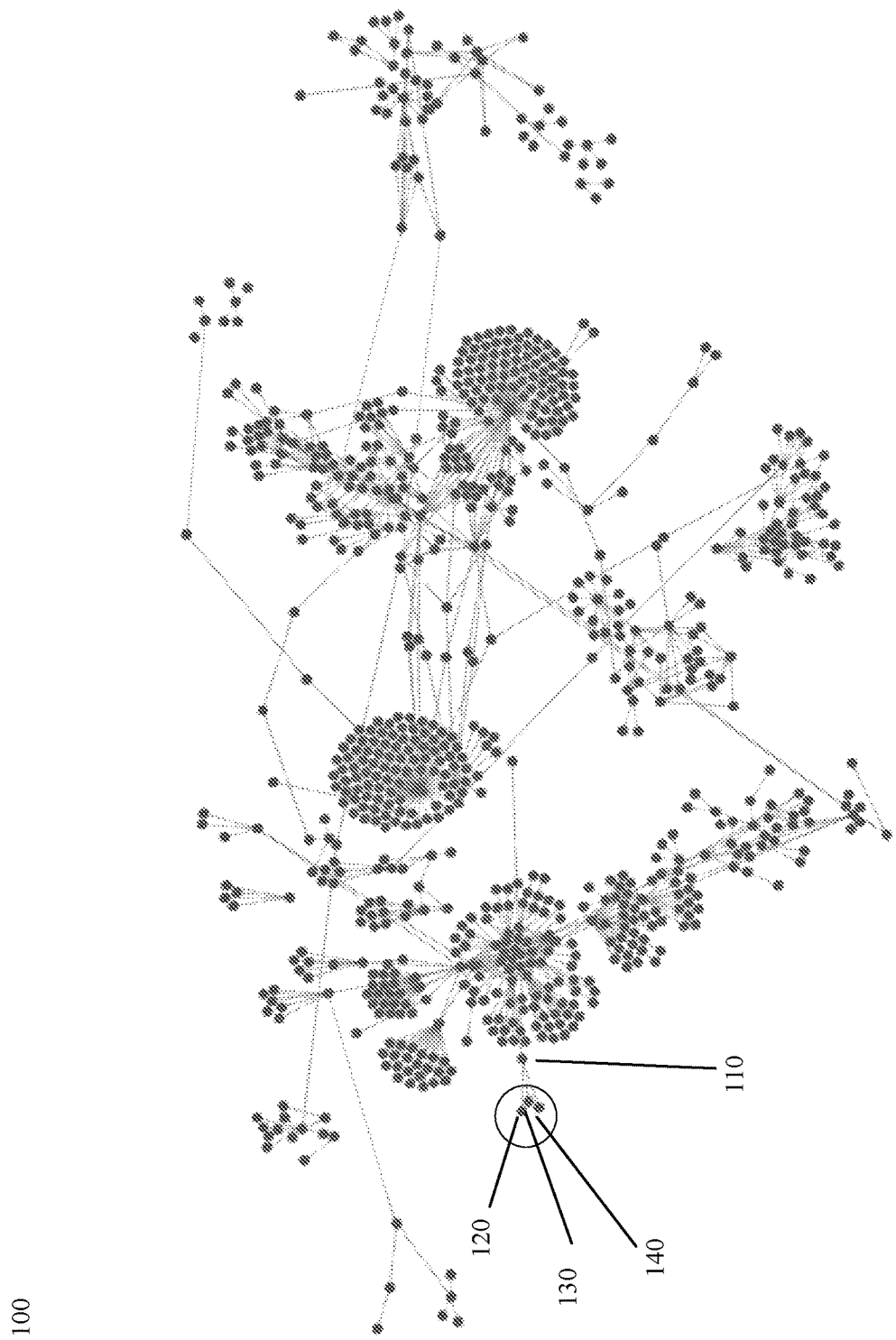
FIG. 1 illustrates an architecture for a production data pipeline.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

Efficient analytics over data pipelines presents several challenges. First, identifying data pipelines is non-trivial and typically achieved by tedious, manual collaboration across large teams. Not all data analytics pipelines of queries connected in producer-consumer relationships are intentional or planned. Second, once identified, it is difficult for developers to optimize the performance and cost of data pipelines because they lack a holistic, global view of the entire pipeline. This is because producers and consumers lack clear contracts that define job/query boundaries and the whereabouts of jobs/queries in the data pipeline. For example, consumer jobs/queries do not typically come with metadata about the underlying input data properties. Similarly, producer jobs/queries do not consider how their outputs are consumed by subsequent jobs/queries. Optimizing such data pipelines can be computationally intractable due to the large number of jobs/queries that have functional dependencies in time.

Optimizing data pipelines is different than optimizing individual queries. First, query engines are not necessarily aware of data pipelines. Current workflow tools that orchestrate data dependencies can be siloed from the query engine. Second, prior work on multi-query optimization focuses, in part, on optimizing the cumulative execution cost of all queries. Furthermore, these solutions have not been optimized to operate at the scale necessary for a large database management system, which can run more than 650k jobs per cluster per day.

Pipeline optimization especially in the context of Machine Learning pipelines is increasingly becoming popular. However, such approaches are less than optimal for queries expressed in SQL dialects. Examples of the technology disclosed herein can address this shortcoming by offering solutions for optimizing large scale production database pipelines. Other systems have looked at data pipelines from the perspective of scheduling, e.g., by scheduling a job based on impact on pending jobs, by scheduling for maximizing concurrent execution of queries containing common subexpressions without materializing. Examples of the technology disclosed herein differs in at least two ways. Unlike previous approaches examples of the technology disclosed herein view scheduling from the perspective of maximizing subexpression reuse by materializing within a storage budget. Previous approaches can be impractical in a production setting due to scale and varying rate of arrival of queries. Examples of the technology disclosed herein introduce a holistic framework incorporating a suite of techniques for optimizing pipelines, in addition to scheduling. Some examples leverage query workloads from big data analytical engines and distributed computation systems to discover data pipelines, optimize resource consumption, and provide pipeline-aware optimization related annotations back to the query engine.

Examples of the technology disclosed herein present an architecture including pipeline discovery, optimization, and execution stages to address the aforementioned challenges. Such examples can enable end users to identify, optimize, and visualize data pipelines. Some examples of the technology disclosed herein can optimize query plans within a data pipeline, in part by identifying/discovering data pipelines through mining producer-consumer relationship between jobs/queries from telemetry.

Some distributed computation systems supporting data analytics pipelines run hundreds of thousands of jobs daily. This can explode the optimization complexity due to presence of very large number of job dependencies which together result in a much larger overall directed analytics graph (DAG); thus, rendering known multi-query optimization techniques impractical. Examples of the technology disclosed herein introduce techniques for reducing this complexity, e.g., using an explainable approach that visually represents data pipelines and gives actionable recommendations.

Figure 2:
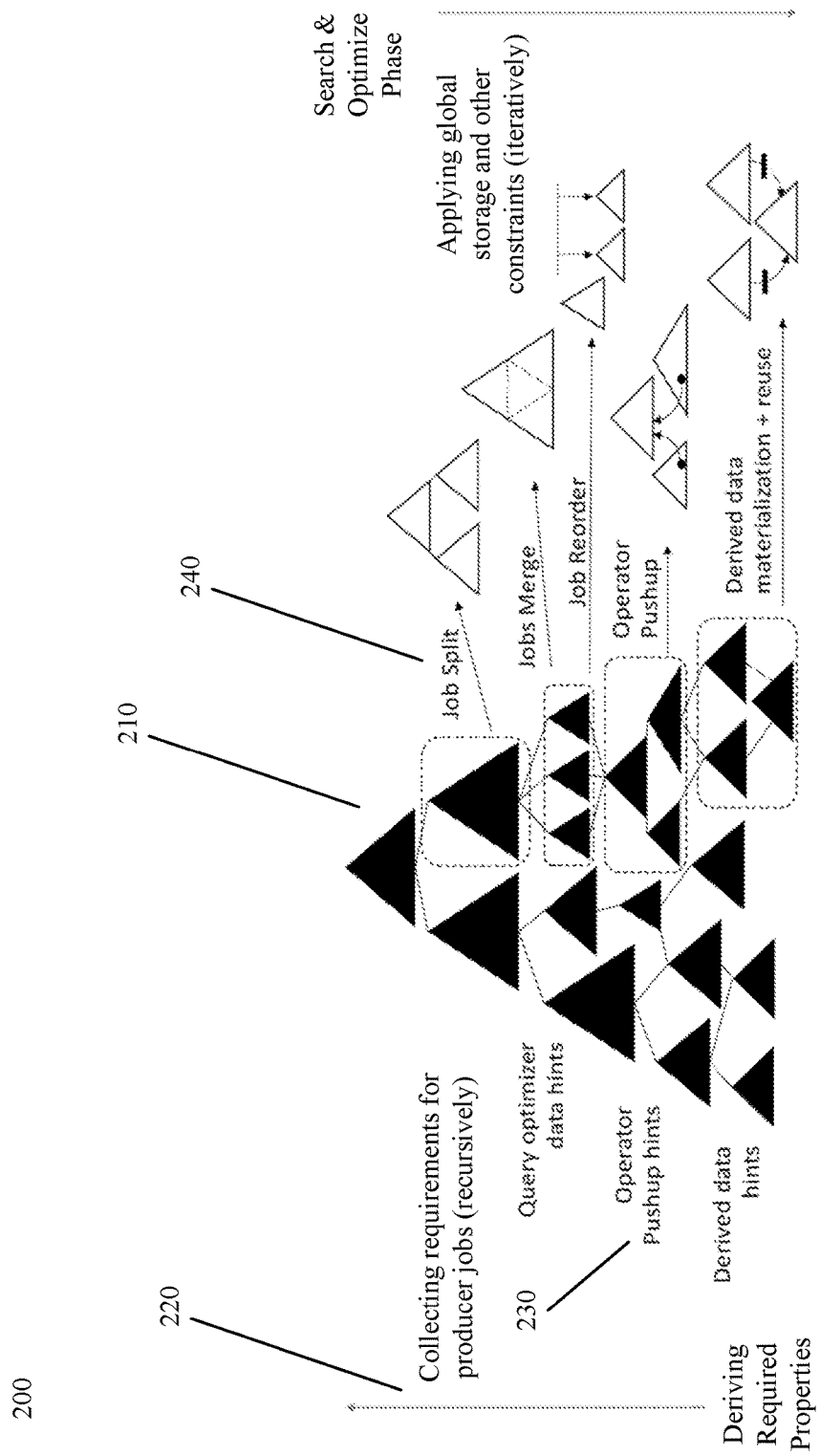
FIG. 2 is an architecture of a query set optimizer, in accordance with examples of the technology disclosed herein.

Pipelines can be discovered in examples of the technology disclosed herein using telemetry logs. In some examples, pipelines cab be discovered by analyzing past query workloads in in distributed computing systems using workload optimization platforms. Such examples, first collect query execution plans and runtime metrics, then analyze telemetry to identify data pipelines by finding recurring producer and consumer jobs, e.g., queries executed at regular intervals with same script templates, but generating new streams with same name each time. Some such examples identify streams emitted by producer jobs/queries that are used as input to consumer jobs/queries—using this information to form an edge in producer-consumer graph. The graph can represent a pipeline such as pipeline 210 shown in FIG. 2.

Examples of the technology discloses herein identify pipeline properties, such as job vitals, runtime statistics, and query access patterns of jobs. Some examples, takes the producer-consumer graph as input and identify consumer job requirements which when satisfied by producer jobs leads to reduction in resource utilization and processing time. Such examples attempt to find more efficient ways to execute the graph while satisfying consumer job requirements. The output of this stage is an optimized data pipeline. Some such examples apply the optimizations into existing query execution engines—through recommendations, automatically, or semi-automatically (e.g., via selection files). Recommendations can be served as annotations to the optimizer for a producer job. These recommendations can be applied automatically in a distributed computation system using a workload optimization program such as Peregrine.

Some examples of the technology disclosed herein use a two-phase, iterative approach for optimization. In a first phase, the technology collects consumer jobs requirements like operator push-up, statistics, etc. in a bottom-up manner from each data pipeline as shown at process 220. Then the technology can apply the optimizations and generates recommendations, which can be surfaced to users.

Examples of the technology disclosed herein can take as input the producer-consumer graph described above. In a bottom-up manner (e.g., process 220) the technology can identify the consumer job requirements that producer jobs must satisfy. For example, the output of producer jobs must be sorted on P.x, output of producer job must project away columns P.a and P.b, output of producer job must satisfy filter predicates in consumer jobs, etc. Since requirements of different consumer jobs can be conflicting (i.e., one consumer job may need a producer job's output to be sorted on P.x, while another requires the output to be sorted on P.y), such examples choose the requirement that optimizes the overall pipeline. Example requirements collected in derive phase include layout, indexes, operator pushup 230, failure probability, scheduling/IO overhead, and reuse opportunity.

Some examples combine the requirements collected from each producer job along the following dimensions: sorting columns, partitioning columns, statistics collection columns, filter predicates, and projection push-up columns. Along each dimension, the technology can choose consumer requirements that optimize the entire pipeline to be pushed to producer jobs. For example, for projection operator push-up the technology can select an intersecting set of columns that satisfies all consumer jobs when pushed up to producer jobs. For physical design, the technology can recommend partitioning and sorting the output of producer jobs, thus reducing the need for multiple consumer jobs to re-partition/re-sort data while satisfying storage and compute constraints.

Recommendations 240 generated by the technology include physical design, operator push-up, job split & merge, and job reorder. In certain large DBMS there can be a significant overlap across consumer jobs, e.g., part of query plan is duplicated across multiple consumer jobs, thus generating redundant cost. Some examples of the technology disclosed herein push common subexpressions to producer jobs in order to improve resource consumption—referred to herein as operator push-up. An example candidate for push-up operation is one in which Q1 produces a stream q1 that is consumed by jobs Q2 and Q3—shown in TABLE 1 below. Both these consumer jobs Q2 and Q3 apply a filter predicate on col3. Pushing this predicate to Q1 saves both storage and compute costs. Examples of the technology disclosed hereon can identify common subexpressions and recommend/implement their push-up to producer jobs.

TABLE 1

Example Candidate for Push-Up Operation

Q1: x = SELECT f(c1) AS c3 FROM t1;
OUTPUT s1 TO "q1";
Q2: y = SELECT * FROM "q1"
WHERE c3 > 10;
Q3: z = SELECT f1(c3) AS c4 FROM "q1"
WHERE c3 > 10;

DBMS users can write both large and small jobs as shown in TABLE 2 from highly utilized DBMS clusters running on a distributed computing system, thus straining the underlying system. The distribution is bimodal, revealing that jobs can be bucketed into "large" (≥50 compute hours) jobs, vs "small" jobs (<50 compute hours). Large jobs are candidates for job split; while small jobs are candidates for job merge.

TABLE 2

Job Runtimes on a Cluster Over a Week.

| Compute Time (in hours) | #Jobs | Percentage of Jobs |
|---|---|---|
| ≤1 | 765K | 13% |
| ≤50 | 3352K | 58% |

TABLE 2-continued

Job Runtimes on a Cluster Over a Week.

| Compute Time (in hours) | #Jobs | Percentage of Jobs |
|---|---|---|
| ≤100 | 3901K | 68% |
| All | 5729K | 100% |

Examples of the technology disclosed herein can merge small jobs (e.g., to avoid the strain on global storage due to three-way replication in such a DBMS) using graph partitioning to minimize the number of edges between groups of small jobs. Large jobs, on the other hand can fail, needing longer restart times. Check-pointing intermediate stages of a job to global storage can mitigate this failure mode. Further, some examples can schedule producer-consumer jobs to get maximum subexpression reuse.

Some examples of the technology disclosed herein can present recommendations apply (either automatically, or after selection by a user) the recommendations on queries. Some examples allow a user to modify the queries and explore different execution scenarios, viz.: pipeline identification and visualization, physical design, columnar push-up, and statistics generation optimizations. Some examples allow a user to input a set of queries and view the producer-consumer graph generated, similar to FIG. 1.

Many distributed computation DBMS users do not specify partitioning/sorting of output streams, causing consumer jobs with same physical design requirements to re-partition/re-sort streams multiple times, wasting compute and storage. In one instance more than half of the intermediate outputs end-up being re-partitioned or re-sorted on the same attributes in consumer jobs, thereby leading to significant operational cost. In context of pipeline optimization, partition/sorting can be pushed up from consumer jobs to producer jobs. In some examples, users can write queries, view recommendations, apply generated recommendations, and view performance of queries before and after applying recommendations.

Consumer jobs often use only a subset of columns from input streams generated by producer jobs. Since these streams can be saved in global storage in the corresponding DBMS, some examples of the technology disclosed herein project out unused columns from producer jobs to save on storage and compute costs. In some production clusters, more than 25% of recurring streams have more than ten unused columns. Thus, eliminating unused columns saves storage and compute cost.

Turning now to the remaining figures, examples are depicted with reference to one or more components and one or more methods that may perform the actions or operations described herein, where components and/or actions/operations in dashed line may be optional. Although the operations described below in flow charts and call flows are presented in a particular order and/or as being performed by an example component, the ordering of the actions and the components performing the actions may be varied, in some examples, depending on the implementation. Moreover, in some examples, one or more of the actions, functions, and/or described components may be performed by a specially programmed processor, a processor executing specially programmed software or computer-readable media, or by any other combination of a hardware component and/or a software component capable of performing the described actions or functions.

Figure 3:
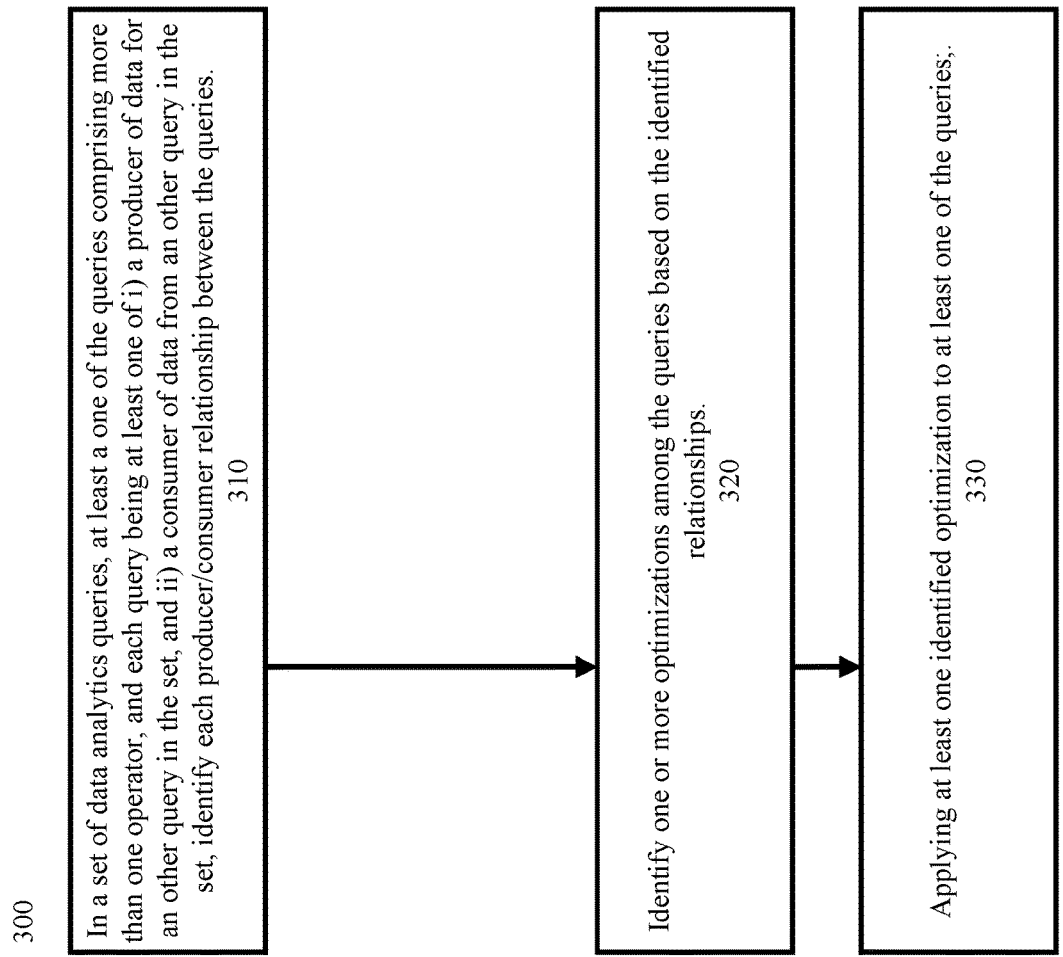
FIG. 3 is a flowchart of methods of query set optimization, in accordance with examples of the technology disclosed herein.

Referring to FIG. 3, and continuing to refer to prior figures for context, a flowchart of methods 300 of query set optimization is shown, in accordance with examples of the technology disclosed herein. Such methods 300 find use in a set of data analytics queries where each query is at least one of i) a producer of data for an other query in the set, and ii) a consumer of data from an other query in the set. At least a one of the queries includes more than one operator. In such methods 300, one or more computing devices identifies each producer/consumer relationship between the queries—Block 310.

Figure 4:
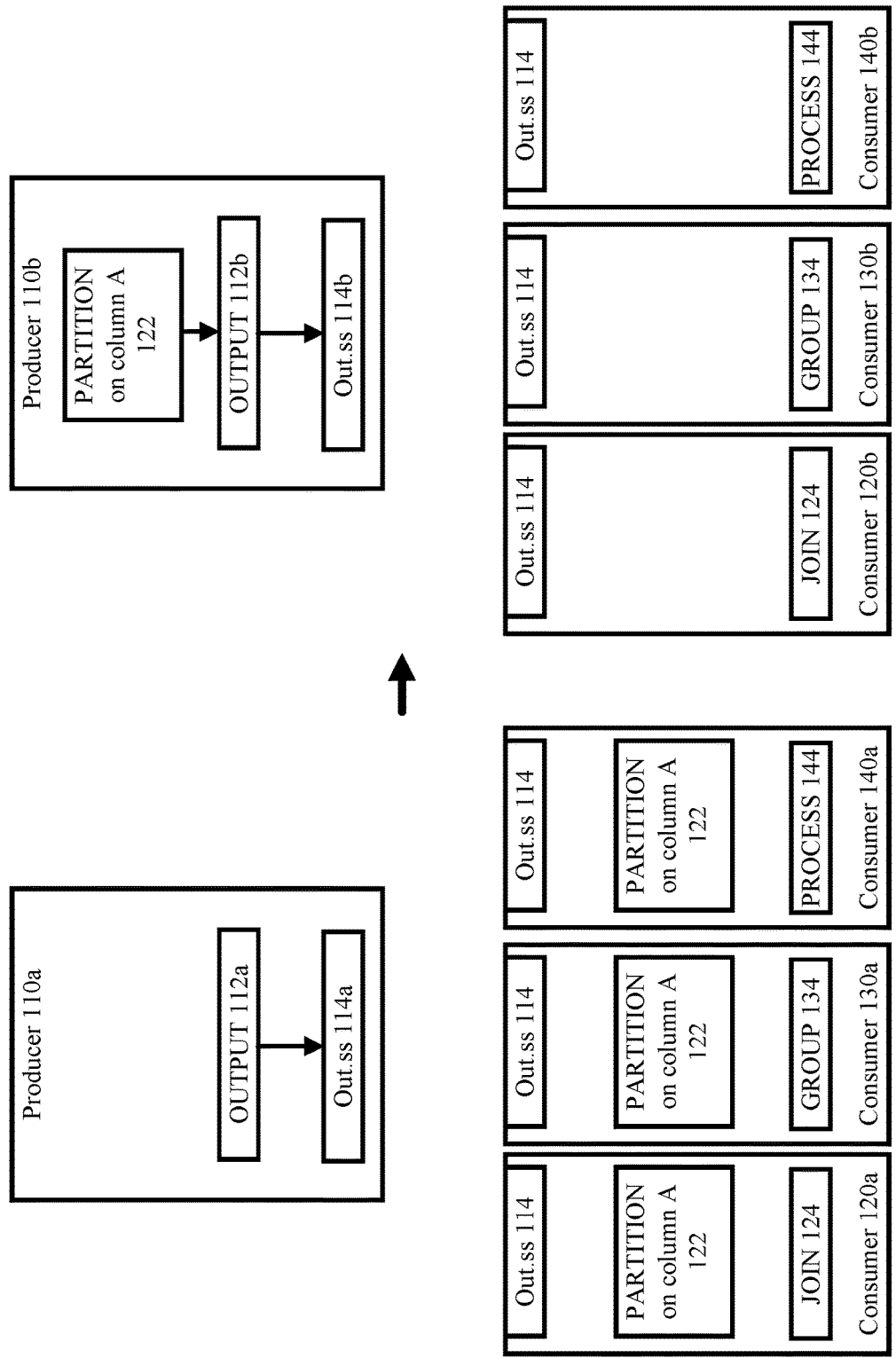
FIG. 4 illustrates a particular set of producer/consumer relationships, in accordance with examples of the technology disclosed herein.

In a continuing example, the set of queries is the data pipeline 100 of FIG. 1. Among the producer/consumer relationships identified are between i) producer 110 and consumer 120, ii) producer 110 and consumer 130, and iii) producer 110 and consumer 140. FIG. 4 illustrates this particular set of producer/consumer relationships 400 as 110a, 120a, 130a, and 140a. Producer 110a uses OUTPUT 112a to create stream Out.ss 114a. Each of consumer 120a, 130a, and 140a consumes stream Out.ss 114 (containing columns including column A) from producer 110a and partitions its copy of stream Out.ss 114 on column A using operation "PARTITION on column A" 122.

Figure 8:
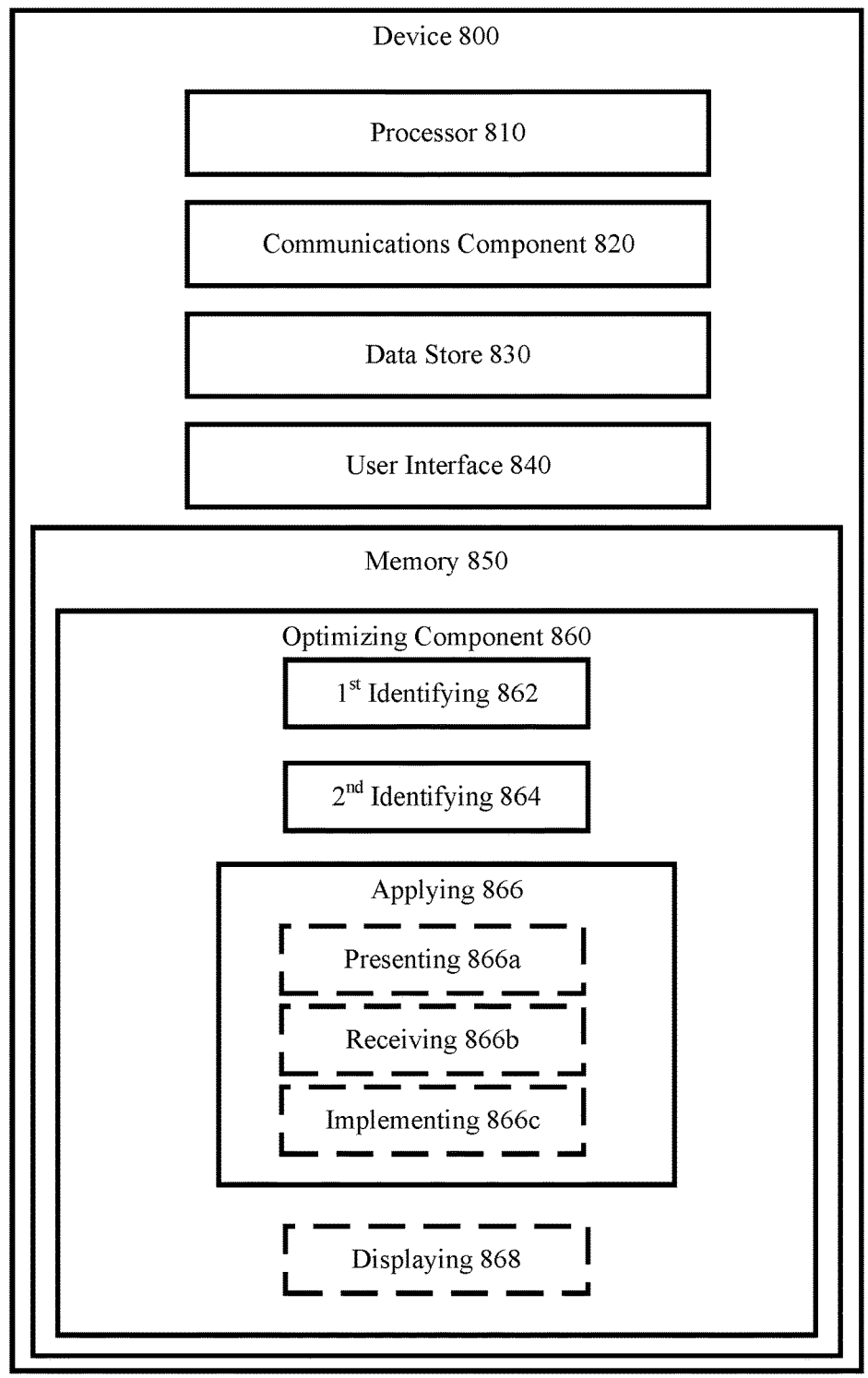
FIG. 8 is a block diagram of an example computing device having components configured to perform a computer-implemented method for query set optimization, in accordance with the technology disclosed herein.

Referring to FIG. 8, and continuing to refer to prior figures for context, a representation of a device 800 for query set optimization implementing a method of FIG. 3 is shown, in accordance with examples of the technology disclosed herein. Device 800, described in more detail below, is one of one or more such devices implementing the method. In some examples, device 800 includes optimizing component 860 that operates along with the other components of device 800. The optimizing component 860 includes first identifying component 862. In some examples, first identifying component 862 identifies each producer/consumer relationship between the queries. Accordingly, first identifying component 862, in conjunction with other elements of device 800 provides means for identifying each producer/consumer relationship between the queries.

In such methods 300, one or more computing devices identifies one or more optimizations among the queries based on the identified relationships—Block 320.

In a second set of examples (in some cases overlapping with other example), the one or more computing devices (such as device 800) identifies one or more optimizations among the queries based on the identified relationships by identifying at least one of: a change in physical design of at least one producer/consumer pair of the set; a change in column projection of at least one query of the set; a split of at least one query of the set into two or more queries; a merger of at least two queries of the set into a merged query; and a reordering of at least two queries of the set.

In the continuing example, the one or more computing devices (such as device 800) identifies operation "PARTITION on column A" 122 of FIG. 4 as common across consumer 120a, 130a, and 140a of a producer 110a that can be moved to producer 110.

In a third set examples (in some cases overlapping with other examples), the one or more computing devices (such as device 800) identifies one or more optimizations among the queries based on the identified relationships comprises identifying portions of an output of a given producer not consumed by any consumer of the producer. In one such other example, referring to FIG. 5 and continuing to refer to prior figures for context, device 800 had identified the given set of producer/consumer relationships 500 as between producer 510a and each of consumers 520a, 530a, and 540a. Producer 510a uses OUTPUT 512a containing columns {A, B, C, D, E, F, G, H} to create stream Out.ss 514a. Each of consumer 520a, 530a, and 540a consumes stream Out.ss 514a (containing columns {A, B, C, D, E, F, G, H}) from producer 510a and reads a different set of columns. But none of consumer 520a, 530a, and 540a performs any operation using columns {E, F, G, H}. Device 800 identifies columns {E, F, G, H} as not consumed by any of consumer 520a, 530a, or 540a.

In a fourth set of examples, (in some cases overlapping with other examples), the one or more computing devices (such as device 800) identifies one or more optimizations among the queries based on the identified relationships comprises identifying a merger of at least two queries of the set based on graph partitioning minimizing a number of edges between groups of queries.

Referring again to FIG. 8, and continuing to refer to prior figures for context, optimizing component 860 includes second identifying component 864. In some examples, second identifying component 864 identifies one or more optimizations among the queries based on the identified relationships. Accordingly, second identifying component 864, in conjunction with other elements of device 800 provides means for identifying one or more optimizations among the queries based on the identified relationships.

In such methods 300, one or more computing devices applies at least one identified optimization to at least one of the queries—Block 330.

In the continuing example, the one or more computing devices (such as device 800) writes operation "PARTITION on column A" 122 to producer 110b and deletes/erases "PARTITION on column A" from each of consumers 120b, 130b, and 140b, as shown in FIG. 4. In the third set examples (in some cases overlapping with other examples), the one or more computing devices (such as device 800) removes columns {E, F, G, H} from OUTPUT 512a to create OUTPUT 512b. None of consumers 520a, 520b, or 520c changes—other than receiving out.ss 514b instead of out.ss 514a. In the fourth set of examples, the one or more computing devices (such as device 800) merger the queries identified as based on graph partitioning minimizing a number of edges between groups of queries.

Referring again to FIG. 8, and continuing to refer to prior figures for context, optimizing component 860 includes applying component 866. In some examples, applying component 866 applies at least one identified optimization to at least one of the queries. Accordingly, applying component 866, in conjunction with other elements of device 800 provides means for applying at least one identified optimization to at least one of the queries.

Figure 6:
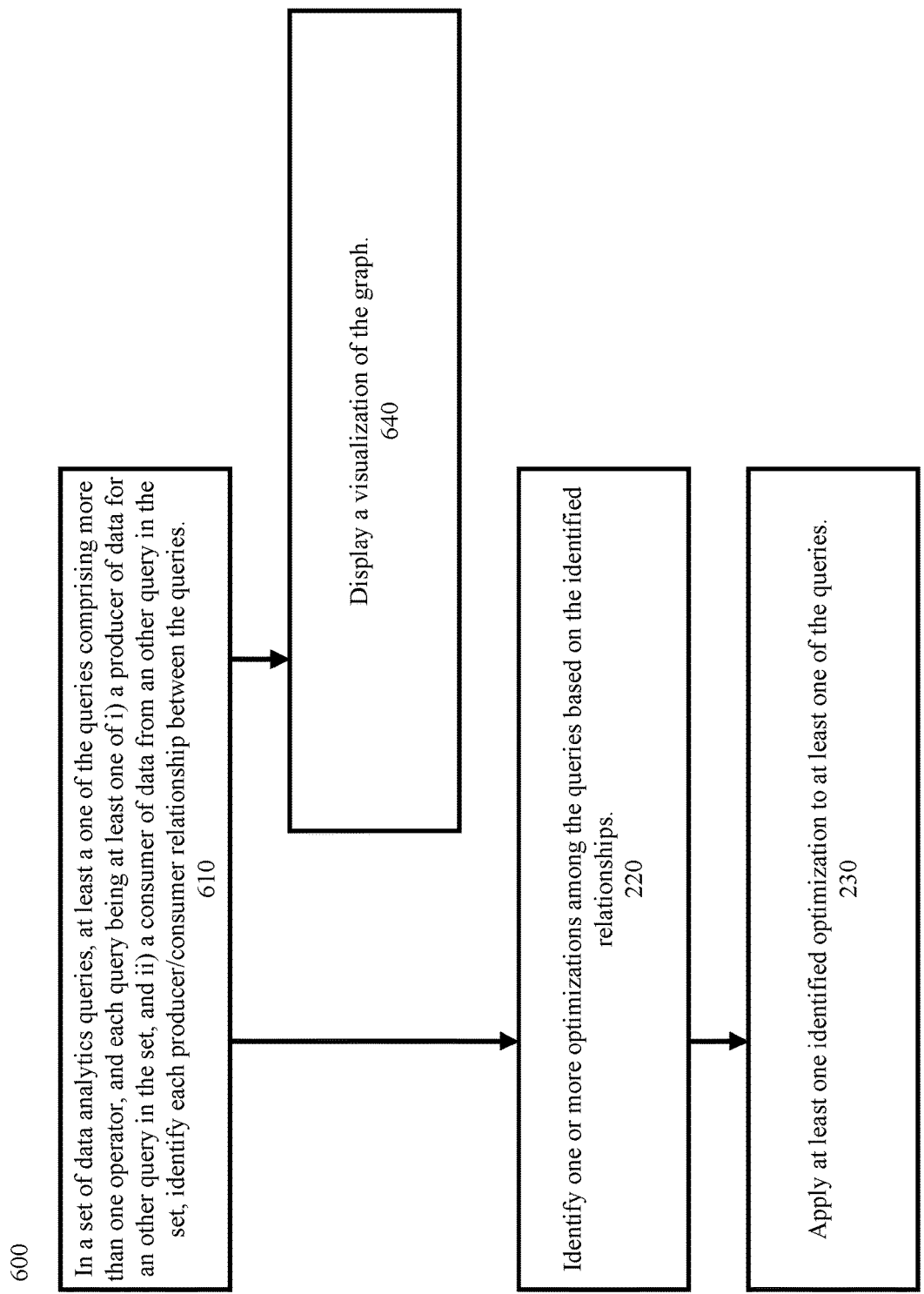
FIG. 6 is a flowchart of methods of query set optimization, in accordance with examples of the technology disclosed herein.

Referring to FIG. 6, and continuing to refer to prior figures for context, a flowchart of methods 600 of query set optimization is shown, in accordance with examples of the technology disclosed herein. In such methods, Block 320 and 330 are performed as described above. In such methods 600, identifying each producer/consumer relationship comprises identifying each producer/consumer relationship as an edge between nodes representing the related queries in a graph—Block 610.

In such methods 600, the one or more computing devices displays a visualization of the graph—Block 640. In the continuing example, computing device (such as device 800) displays a visualization similar to pipeline 210, but with identifiers that are selectable to present relationships between producers and consumers similar to those for FIG. 4 and FIG. 5

Referring again to FIG. 8, and continuing to refer to prior figures for context, optimizing component 860 includes displaying component 868. In some examples, displaying component 868 displays a visualization of the graph. Accordingly, displaying component 868, in conjunction with other elements of device 800 provides means for displaying a visualization of the graph.

Figure 7:
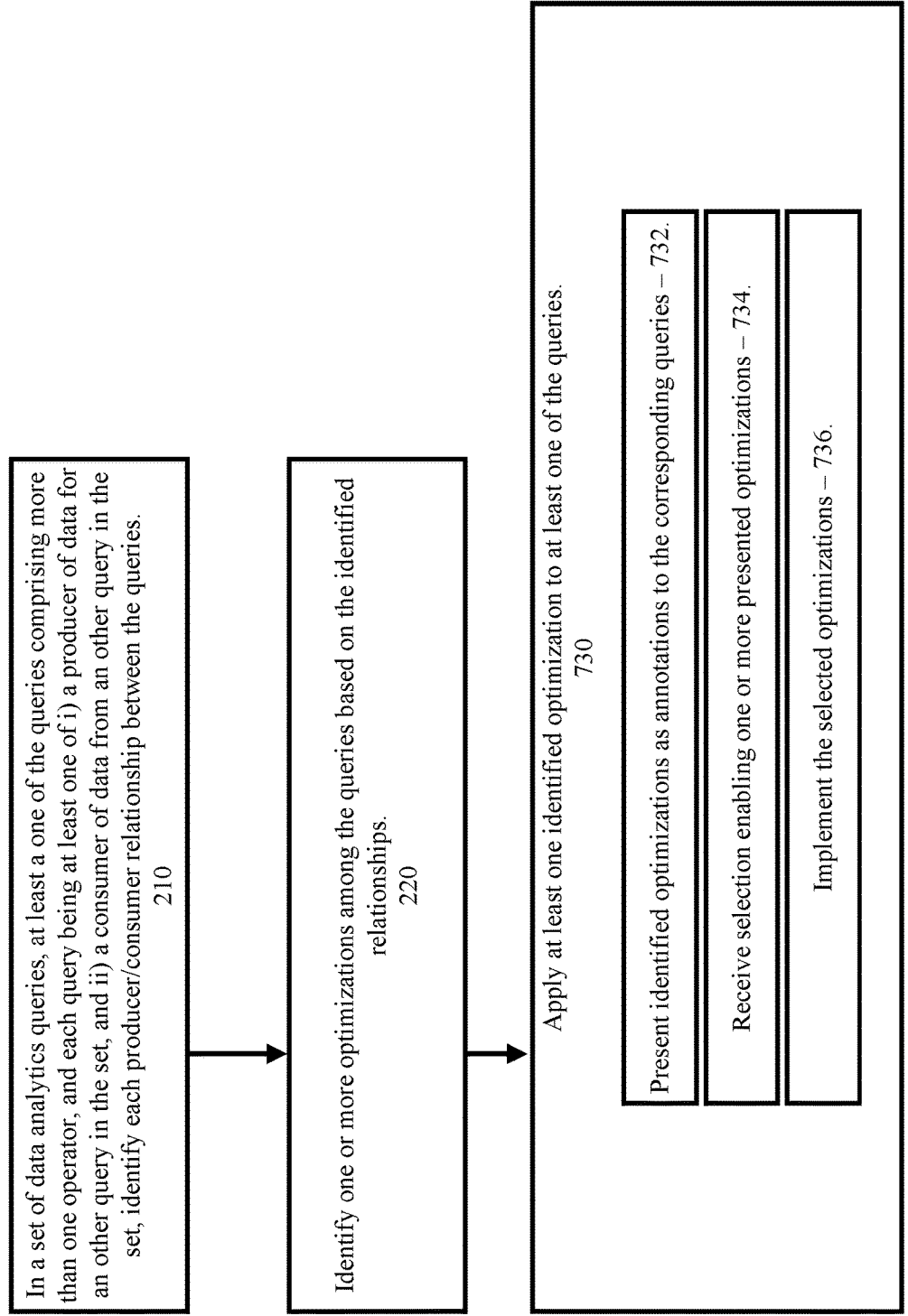
FIG. 7 is a flowchart of methods of query set optimization, in accordance with examples of the technology disclosed herein.

Referring to FIG. 7, and continuing to refer to prior figures for context, a flowchart of methods 700 of query set optimization is shown, in accordance with examples of the technology disclosed herein. In such methods, Blocks 310 and 320 are performed as described above. Block 730 (applying at least one identified optimization to at least one of the queries) is performed as described in conjunction with Block 330, and additionally includes presenting identified optimizations as annotations to the corresponding queries—Block 732.

Figure 5:
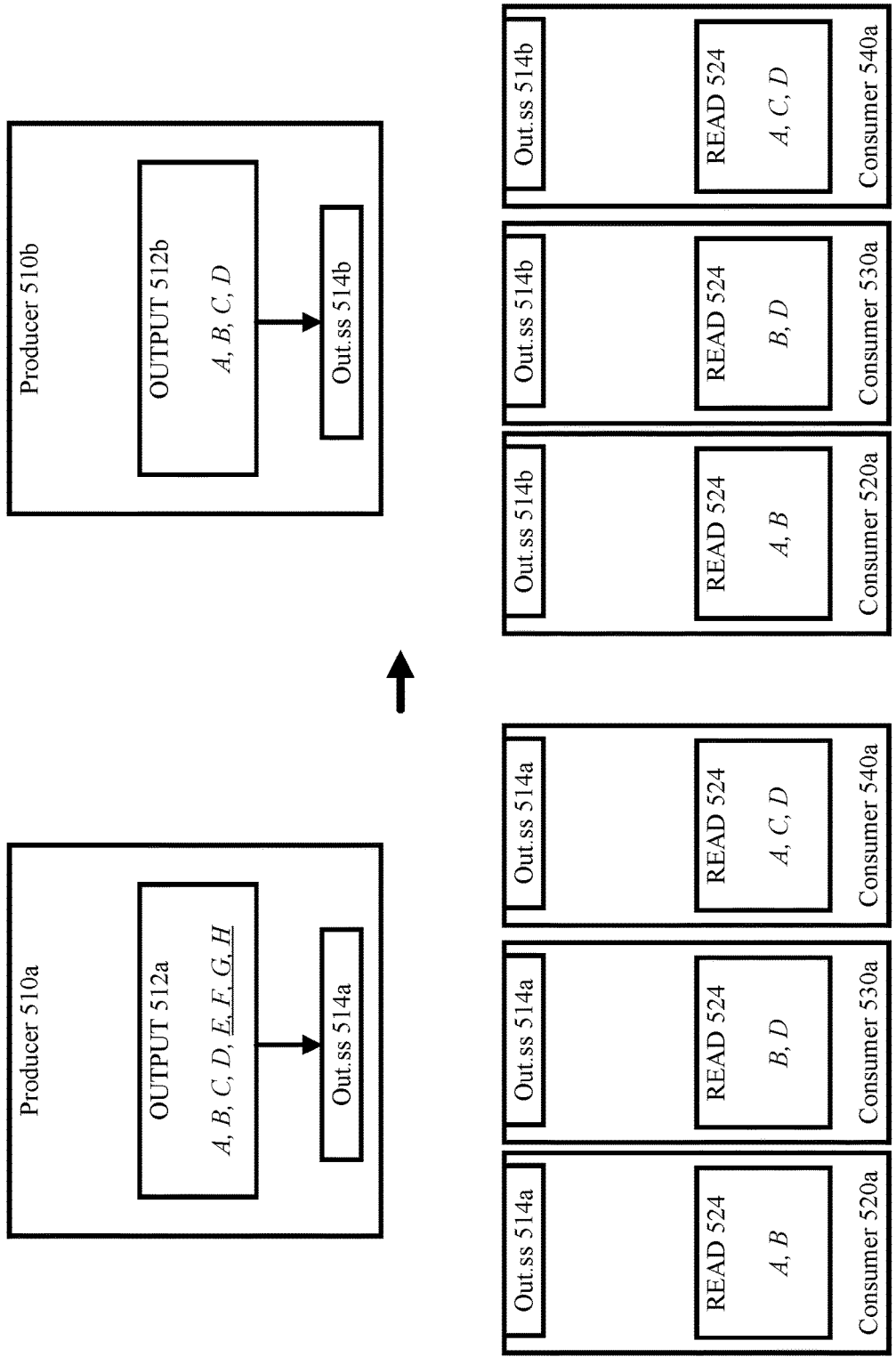
FIG. 5 illustrates a given set of producer/consumer relationships, in accordance with examples of the technology disclosed herein.

In the continuing example, both the operator push up shown in FIG. 4 and the column projection push up shown in FIG. 5 are presented to a user for selection. In other examples, the identified candidate modifications are encapsulated in an input file for the selection process.

Referring again to FIG. 8, and continuing to refer to prior figures for context, optimizing component 860 includes presenting component 868a. In some examples, presenting component 868a presents identified optimizations as annotations to the corresponding queries. Accordingly, presenting component 868a, in conjunction with other elements of device 800 provides means for presenting identified optimizations as annotations to the corresponding queries.

Block 730 also includes receiving selection enabling one or more presented optimizations—Block 734. In the continuing example, computing device 800 receives selection of the operator push up shown in FIG. 4, but the column projection push up shown in FIG. 5 is not selected.

Referring again to FIG. 8, and continuing to refer to prior figures for context, optimizing component 860 includes presenting component 868a. In some examples, presenting component 868a presents identified optimizations as annotations to the corresponding queries. Accordingly, presenting component 868a, in conjunction with other elements of device 800 provides means for presenting identified optimizations as annotations to the corresponding queries.

Block 730 also includes implementing the selected optimization(s)—Block 736. In the continuing example, computing device 800 implementing the selected optimizations selection of the operator push up shown in FIG. 4, but the unselected column projection push up shown in FIG. 5 is not implemented.

Referring again to FIG. 8, and continuing to refer to prior figures for context, optimizing component 860 includes implementing component 868c. In some examples, implementing component 868c implements the selected optimization(s). Accordingly, implementing component 868c, in conjunction with other elements of device 800 provides means for implementing the selected optimization(s).

Generally, FIG. 8 illustrates an example of a device 800 including optional component details. In one aspect, device 800 includes processor 810 for carrying out processing functions associated with one or more of components and functions described herein. Processor 810 can include a single or multiple set of processors or multi-core processors. Moreover, processor 810 can be implemented as an integrated processing system and/or a distributed processing system.

Device 800 further includes data store 830, e.g., for storing local versions of operating systems (or components thereof) and/or applications being executed by processor 810, such as query set optimization component 850. Data store 830 can include a type of memory usable by a computer, such as random-access memory (RAM), read only memory (ROM), tapes, magnetic discs, optical discs, volatile memory, non-volatile memory, and any combination thereof.

Further, device 800 may include a communications component 820 that provides for establishing and maintaining communications with one or more other devices, parties, entities, etc. utilizing hardware, software, and services as described herein. Communications component 820 may carry communications between components on device 800, as well as between device 800 and external devices, such as devices located across a communications network and/or devices serially or locally connected to device 800. For example, communications component 820 may include one or more buses, and may further include transmit chain components and receive chain components associated with a wireless or wired transmitter and receiver, respectively, operable for interfacing with external devices.

Additionally, device 800 may include a data store 830, which can be any suitable combination of hardware and/or software, which provides for mass storage of information, databases, and programs employed in connection with aspects described herein. For example, data store 830 may be or may include a data repository for operating systems (or components thereof), applications, related parameters, etc. not currently being executed by processor 810. In addition, data store 830 may be a data repository for the query set optimization component 850.

Device 800 may optionally include a user interface component 840 operable to receive inputs from a user of device 800 (e.g., datacenter maintenance personnel) and further operable to generate outputs for presentation to the user. User interface component 840 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 840 may include one or more output devices, including but not limited to a display, a speaker, a haptic feedback mechanism, a printer, any other mechanism capable of presenting an output to a user, or any combination thereof.

In some examples, the technology disclosed herein includes computer-implemented methods, devices, and computer program products for query set optimization. Such examples find use in a set of data analytics queries, at least a one of the queries comprising more than one operator, and each query being at least one of i) a producer of data for an other query in the set, and ii) a consumer of data from an other query in the set.

Example #1 includes identifying each producer/consumer relationship between the queries; identifying one or more optimizations among the queries based on the identified relationships; and applying at least one identified optimization to at least one of the queries. Example #2 includes the features of Example #1, in which identifying each producer/consumer relationship includes identifying each producer/consumer relationship as an edge between nodes representing the related queries in a graph. In such examples, the one or more computing devices display a visualization of the graph.

Example #3 includes the features or one or more of the prior examples in which identifying one or more optimizations among the queries based on the identified relationships comprises: identifying at least one of: a change in physical design of at least one producer/consumer pair of the set; a change in column projection of at least one query of the set; a split of at least one query of the set into two or more queries; a merger of at least two queries of the set into a merged query; and a reordering of at least two queries of the set. Example #4 includes the features or one or more of the prior examples, in which identifying one or more optimizations among the queries based on the identified relationships includes identifying an operation as common across a plurality of consumers of a particular producer that can be moved to the particular producer; and a change in physical design includes moving the identified operation to the particular producer. Example #5 includes the features or one or more of the prior examples, in which identifying one or more optimizations among the queries based on the identified relationships includes identifying portions of an output of a given producer as not consumed by any consumer of the producer; and a change in column projection includes deleting the identified portions from the output of the given producer. Example #6 includes the features or one or more of the prior examples, in which identifying one or more optimizations among the queries based on the identified relationships includes identifying a merger of at least two queries of the set based on graph partitioning minimizing a number of edges between groups of queries. Example #7 includes the features or one or more of the prior examples, in which applying at least one identified optimization to at least one of the queries includes: presenting identified optimizations as annotations to the corresponding queries; receiving selection enabling one or more presented optimizations; and implementing the selected optimizations.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium, e.g., a non-transitory computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A query set optimization device, the device comprising:
a memory storing instructions; and
at least one processor communicatively coupled with the memory and configured to, in a set of data analytics queries, at least a one of the queries comprising more than one operator, and each query being at least one of
i) a producer of data for an other query in the set, and
ii) a consumer of data from an other query in the set:
identify each producer/consumer relationship between the queries;
identify one or more optimizations among the queries based on the identified relationships; and
apply at least one identified optimization to at least one of the queries.

2. The device of claim 1, wherein:
identifying each producer/consumer relationship comprises identifying each producer/consumer relationship as an edge between nodes representing the related queries in a graph, and
the at least one processor is further configured to display a visualization of the graph.

3. The device of claim 1, wherein identifying one or more optimizations among the queries based on the identified relationships comprises: identifying at least one of:
a change in physical design of at least one producer/consumer pair of the set;
a change in column projection of at least one query of the set;
a split of at least one query of the set into two or more queries;
a merger of at least two queries of the set into a merged query; and
a reordering of at least two queries of the set.

4. The device of claim 3, wherein:
identifying one or more optimizations among the queries based on the identified relationships comprises identifying an operation as common across a plurality of consumers of a particular producer that can be moved to the particular producer; and
a change in physical design comprises moving the identified operation to the particular producer.

5. The device of claim 3, wherein:
identifying one or more optimizations among the queries based on the identified relationships comprises identifying portions of an output of a given producer as not consumed by any consumer of the producer; and
a change in column projection comprises deleting the identified portions from the output of the given producer.

6. The device of claim 3, wherein:
identifying one or more optimizations among the queries based on the identified relationships comprises identifying a merger of at least two queries of the set based on graph partitioning minimizing a number of edges between groups of queries.

7. The device of claim 1, wherein applying at least one identified optimization to at least one of the queries comprises:
presenting identified optimizations as annotations to the corresponding queries;
receiving selection enabling one or more presented optimizations; and
implementing the selected optimizations.

8. A computer-implemented method comprising:
in a set of data analytics queries, at least a one of the queries comprising more than one operator, and each query being at least one of i) a producer of data for an other query in the set, and ii) a consumer of data from an other query in the set:
identifying, by one or more computing devices, each producer/consumer relationship between the queries;
identifying, by the one or more computing devices, one or more optimizations among the queries based on the identified relationships; and
applying, by the one or more computing devices, at least one identified optimization to at least one of the queries.

9. The method of claim 8, wherein:
identifying each producer/consumer relationship comprises identifying each producer/consumer relationship as an edge between nodes representing the related queries in a graph, and
the method further comprises, displaying, by the one or more computing devices, a visualization of the graph.

10. The method of claim 8, wherein identifying one or more optimizations among the queries based on the identified relationships comprises: identifying at least one of:
a change in physical design of at least one producer/consumer pair of the set;
a change in column projection of at least one query of the set;
a split of at least one query of the set into two or more queries;
a merger of at least two queries of the set into a merged query; and
a reordering of at least two queries of the set.

11. The method of claim 10, wherein:
identifying one or more optimizations among the queries based on the identified relationships comprises identifying an operation as common across a plurality of consumers of a particular producer that can be moved to the particular producer; and
a change in physical design comprises moving the identified operation to the particular producer.

12. The method of claim 10, wherein:
identifying one or more optimizations among the queries based on the identified relationships comprises identifying portions of an output of a given producer as not consumed by any consumer of the producer; and
a change in column projection comprises deleting the identified portions from the output of the given producer.

13. The method of claim 10, wherein:
identifying one or more optimizations among the queries based on the identified relationships comprises identifying a merger of at least two queries of the set based on graph partitioning minimizing a number of edges between groups of queries.

14. The method of claim 8, wherein applying, by the one or more computing devices, at least one identified optimization to at least one of the queries comprises:
presenting identified optimizations as annotations to the corresponding queries;
receiving selection enabling one or more presented optimizations; and
implementing the selected optimizations.

15. A non-transitory computer-readable medium storing instructions thereon that, when executed by at least one computing device, causes the at least one computing device to perform operations comprising:
in a set of data analytics queries, at least a one of the queries comprising more than one operator, and each query being at least one of i) a producer of data for an other query in the set, and ii) a consumer of data from an other query in the set:
identifying each producer/consumer relationship between the queries;
identifying one or more optimizations among the queries based on the identified relationships; and
applying at least one identified optimization to at least one of the queries.

16. The computer-readable medium of claim 15, wherein:
identifying each producer/consumer relationship comprises identifying each producer/consumer relationship as an edge between nodes representing the related queries in a graph, and
the instructions, when executed by at least one computing device, causes the at least one computing device to display a visualization of the graph.

17. The computer-readable medium of claim 15, wherein identifying one or more optimizations among the queries based on the identified relationships comprises: identifying at least one of:
a change in physical design of at least one producer/consumer pair of the set;
a change in column projection of at least one query of the set;
a split of at least one query of the set into two or more queries;
a merger of at least two queries of the set into a merged query; and
a reordering of at least two queries of the set.

18. The computer-readable medium of claim 17, wherein:
identifying one or more optimizations among the queries based on the identified relationships comprises identifying an operation as common across a plurality of consumers of a particular producer that can be moved to the particular producer; and
a change in physical design comprises moving the identified operation to the particular producer.

19. The computer-readable medium of claim 17, wherein:
identifying one or more optimizations among the queries based on the identified relationships comprises identifying portions of an output of a given producer as not consumed by any consumer of the producer; and a change in column projection comprises deleting the identified portions from the output of the given producer.

20. The computer-readable medium of claim 15, wherein applying, by the one or more computing devices, at least one identified optimization to at least one of the queries comprises:

presenting identified optimizations as annotations to the corresponding queries;

receiving selection enabling one or more presented optimizations; and implementing the selected optimizations.

* * * * *